US011145114B2

(12) United States Patent
Mitchell et al.

(10) Patent No.: US 11,145,114 B2
(45) Date of Patent: *Oct. 12, 2021

(54) HIGHER-ORDER FUNCTION NETWORKS FOR LEARNING COMPOSABLE THREE-DIMENSIONAL (3D) OBJECT AND OPERATING METHOD THEREOF

(71) Applicant: SAMSUNG ELECTRONICS CO., LTD., Suwon-si (KR)

(72) Inventors: Eric Mitchell, Standard, CA (US); Selim Engin, Minneapolis, MN (US); Volkan Isler, Saint Paul, MN (US); Daniel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,779

(22) Filed: Dec. 8, 2020

(65) Prior Publication Data

US 2021/0166470 A1  Jun. 3, 2021

Related U.S. Application Data

(63) Continuation of application No. 16/811,755, filed on Mar. 6, 2020, now Pat. No. 10,922,877.

(Continued)

(51) Int. Cl.
*G06T 15/20* (2011.01)
*G06N 3/08* (2006.01)
*G06N 3/04* (2006.01)

(52) U.S. Cl.
CPC ......... *G06T 15/205* (2013.01); *G06N 3/0454* (2013.01); *G06N 3/08* (2013.01)

(58) Field of Classification Search
CPC ....... G06T 11/00; G06T 15/00; G06T 15/205; G06T 17/00; G06T 19/00; G06T 19/006;
(Continued)

(56) References Cited

U.S. PATENT DOCUMENTS 8,717,412 B2   5/2014  Linder et al.
8,749,795 B2   6/2014  Sugita
(Continued)

FOREIGN PATENT DOCUMENTS

JP    5936159 B1    6/2016
KR    10-1799700 B1  12/2017

OTHER PUBLICATIONS

Mitchell, Eric, et al. "Higher-Order Function Networks for Learning Composable 3D Object Representations." arXiv preprint arXiv: 1907.10388 (2019). (Year: 2019).*

(Continued)

*Primary Examiner* — Sae Won Yoon
(74) *Attorney, Agent, or Firm* — Sughrue Mion, PLLC

(57) ABSTRACT

An apparatus for representing a three-dimensional (3D) object, the apparatus includes a memory storing instructions, and a processor configured to execute the instructions to transmit a two-dimensional (2D) image to an external device, based on the 2D image being transmitted, receive, from the external device, mapping function parameters that are obtained using a first neural network, set a mapping function of a second neural network, based on the received mapping function parameters, and based on 3D samples, obtain the 3D object corresponding to the 2D image, using the second neural network of which the mapping function is set.

20 Claims, 13 Drawing Sheets

Related U.S. Application Data

(60) Provisional application No. 62/869,473, filed on Jul. 1, 2019.

(58) Field of Classification Search
CPC . G06T 2207/20081; G06T 2207/20084; G06T 2210/56; G06N 3/02; G06N 3/0454; G06N 3/08; G06N 20/00; G06F 3/011; G02B 27/01; G02B 27/017; G02B 2027/0178; H04N 13/332; H04N 13/344
USPC ........................................................ 345/419
See application file for complete search history.

(56) References Cited

U.S. PATENT DOCUMENTS

| | | |
|---|---|---|
| 10,529,113 B1* | 1/2020 | Sheikh ............... G06K 9/00302 |
| 2018/0285660 A1 | 10/2018 | Ohara et al. |
| 2018/0357834 A1 | 12/2018 | Bleiweiss et al. |
| 2019/0026917 A1 | 1/2019 | Liao et al. |
| 2019/0026956 A1* | 1/2019 | Gausebeck ............ H04N 13/10 |
| 2019/0035165 A1 | 1/2019 | Gausebeck |
| 2019/0037197 A1 | 1/2019 | Mukherjee et al. |
| 2019/0095791 A1 | 3/2019 | Liu et al. |
| 2019/0147245 A1 | 5/2019 | Qi et al. |
| 2019/0355147 A1* | 11/2019 | Li ............................. G06T 7/70 |
| 2020/0167905 A1* | 5/2020 | Bian ................. G01N 21/8851 |
| 2020/0312003 A1* | 10/2020 | Borovikov ............. G06N 20/20 |
| 2021/0073953 A1* | 3/2021 | Lee ......................... G06T 7/571 |

OTHER PUBLICATIONS

Lahoud, Jean, and Bernard Ghanem. "2d-driven 3d object detection in rgb-d images." Proceedings of the IEEE International Conference on Computer Vision. 2017. (Year: 2017).*

Zhao, Ruiqi, et al. "Fast and precise face alignment and 3d shape reconstruction from a single 2d image." European Conference on Computer Vision. Springer, Cham, 2016. (Year: 2016).*

Guo, Haiyun, et al. "Multi-view 3D object retrieval with deep embedding network." IEEE Transactions on Image Processing 25.12 (Sep. 2016): 5526-5537. (Year: 2016).*

International Search Report and Written Opinion dated Aug. 31, 2020 by the International Searching Authority in counterpart International Patent Application No. PCT/KR2020/007152. (PCT/ISA/210, PCT/ISA/220 and PCT/ISA/237).

* cited by examiner

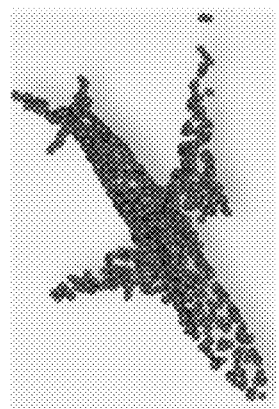
FIG. 3
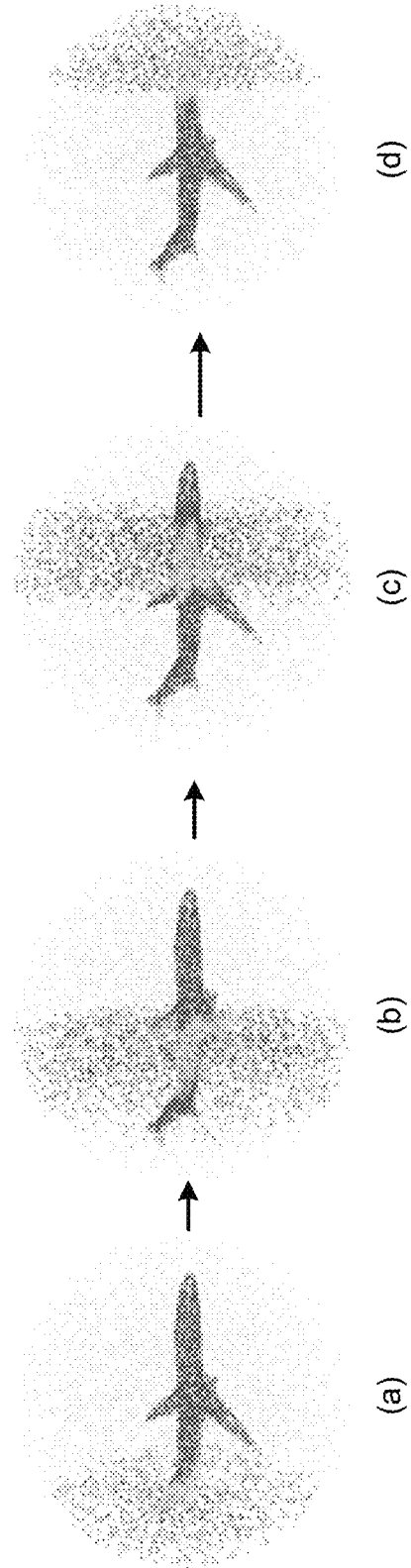
FIG. 4

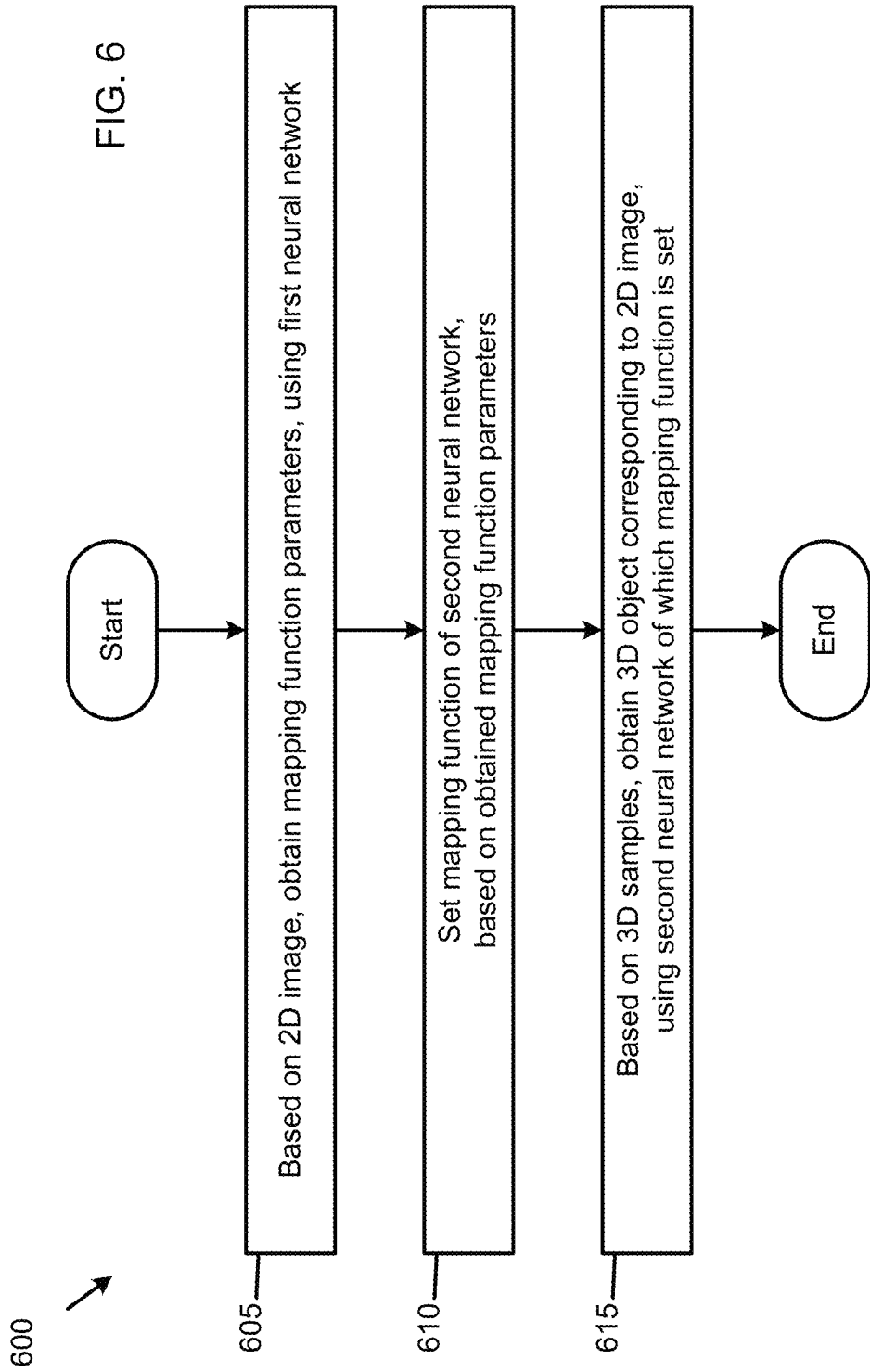

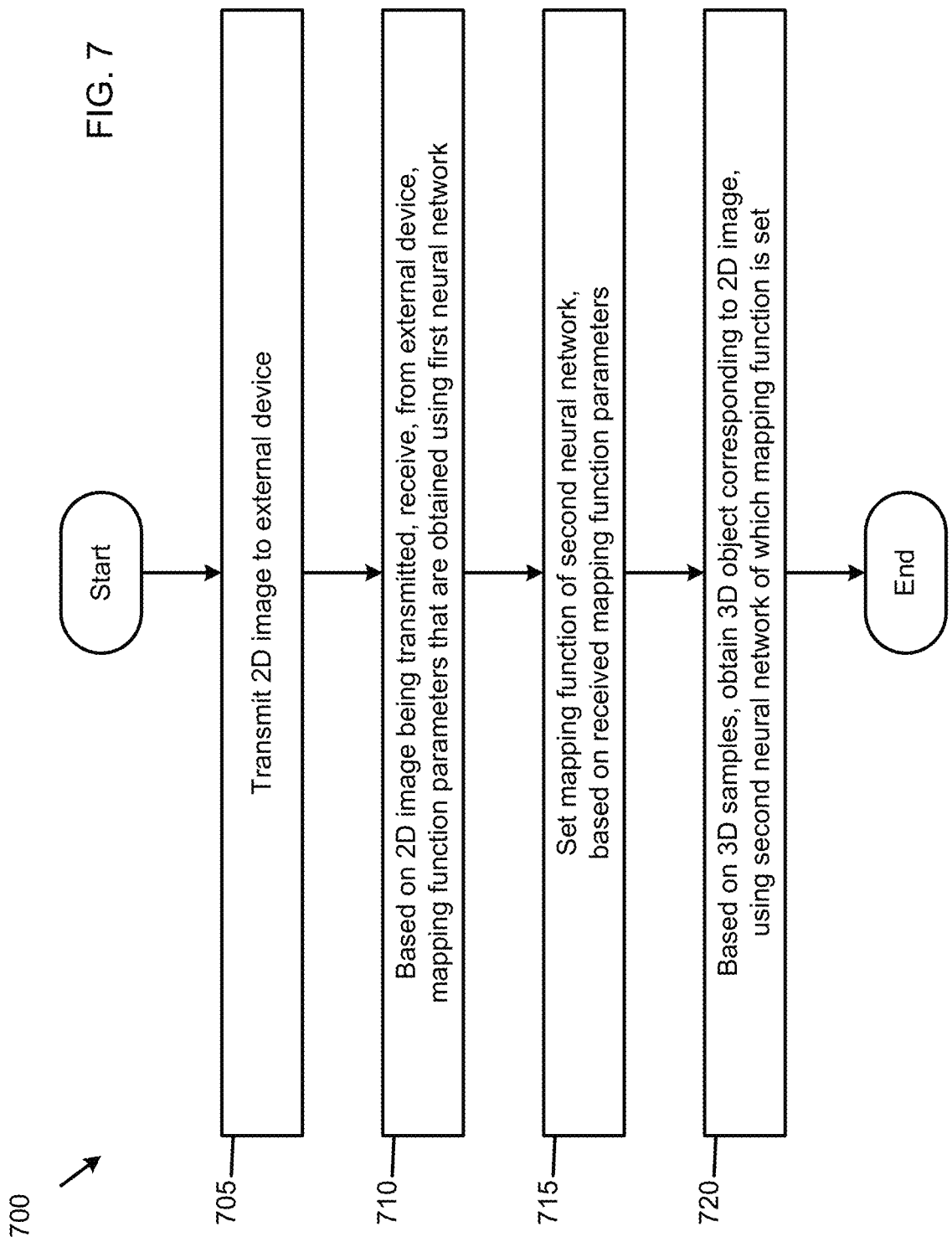

HIGHER-ORDER FUNCTION NETWORKS FOR LEARNING COMPOSABLE THREE-DIMENSIONAL (3D) OBJECT AND OPERATING METHOD THEREOF

CROSS-REFERENCE TO RELATED APPLICATION

This is a continuation application of U.S. patent application Ser. No. 16/811,755, filed Mar. 6, 2020, in the US Patent and Trademark Office, which claims priority from U.S. Provisional Patent Application No. 62/869,473, filed on Jul. 1, 2019, in the U.S. Patent and Trademark Office, the disclosure of which is incorporated herein by reference in its entirety.

BACKGROUND

1. Field

The disclosure relates to representing three-dimensional (3D) objects, and more particularly, to higher-order function networks for learning a composable 3D object and an operating method thereof.

2. Description of Related Art

In purely geometric terms, a 3D object O is a subset of $\mathbb{R}^3$. Directly representing this infinite set of points in memory, however, is not straightforward Voxel-based approaches use a uniform discretization of this set to extend convolutional neural network (CNN) based approaches to the 3D world. However, the inherent sparsity of 3D surfaces make voxelization inefficient in terms of both memory and computation time.

Partition-based approaches such as octrees address the space efficiency shortcomings of voxelization, but they are tedious to implement and inefficient to query.

Point set representations, discrete and finite subsets of O, have also gained popularity due to the fact that they retain the simplicity of voxel based methods while eliminating their storage and computational burden. Although point clouds are more flexible than voxels, it is still not clear how to adapt them to the task of producing arbitrary- or varied-resolution predictions.

SUMMARY

According to embodiments, an apparatus for representing a three-dimensional (3D) object, includes a memory storing instructions, and a processor configured to execute the instructions to transmit a two-dimensional (2D) image to an external device, based on the 2D image being transmitted, receive, from the external device, mapping function parameters that are obtained using a first neural network, set a mapping function of a second neural network, based on the received mapping function parameters, and based on 3D samples, obtain the 3D object corresponding to the 2D image, using the second neural network of which the mapping function is set.

The 3D samples may be of a surface or an interior of a 3D canonical domain.

The 3D canonical domain may be a unit sphere or a unit cube.

The 3D object may be a surface or an interior of an object included in the 2D image.

The first neural network may be a convolutional neural network (CNN) that is trained to output the mapping function parameters, based on the 2D image that is input in the CNN, and may be trained in connection with the second neural network.

The second neural network may be a convolutional neural network (CNN) that is trained to output the 3D object, based on the 3D samples that are input in the CNN, and may be trained in connection with the first neural network.

The apparatus may be a client device that is separate and external from the external device.

The external device may be a server device that is separate and external from the apparatus.

According to embodiments, a method of representing a three-dimensional (3D) object, is performed by an apparatus, and includes transmitting a two-dimensional (2D) image to an external device, based on the 2D image being transmitted, receiving, from the external device, mapping function parameters that are obtained using a first neural network, setting a mapping function of a second neural network, based on the received mapping function parameters, and based on 3D samples, obtaining the 3D object corresponding to the 2D image, using the second neural network of which the mapping function is set.

The 3D samples may be of a surface or an interior of a 3D canonical domain.

The 3D canonical domain may be a unit sphere or a unit cube.

The 3D object may be a surface or an interior of an object included in the 2D image.

The first neural network may be a convolutional neural network (CNN) that is trained to output the mapping function parameters, based on the 2D image that is input in the CNN, and may be trained in connection with the second neural network.

The second neural network may be a convolutional neural network (CNN) that is trained to output the 3D object, based on the 3D samples that are input in the CNN, and may be trained in connection with the first neural network.

The apparatus may be a client device that is separate and external from the external device.

The external device may be a server device that is separate and external from the apparatus.

According to embodiments, a non-transitory computer-readable storage medium storing instructions configured to cause a processor to transmit a two-dimensional (2D) image to an external device, based on the 2D image being transmitted, receive, from the external device, mapping function parameters that are obtained using a first neural network, set a mapping function of a second neural network, based on the received mapping function parameters, and based on 3D samples, obtain the 3D object corresponding to the 2D image, using the second neural network of which the mapping function is set.

The 3D samples may be of a surface or an interior of a 3D canonical domain.

The 3D canonical domain may be a unit sphere or a unit cube.

The 3D object may be a surface or an interior of an object included in the 2D image.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 3 is a diagram of a two-dimensional (2D) image and a 3D object that are respectively input to and output from an apparatus for representing a 3D object, according to embodiments;

FIG. 4 is a diagram of a method of sampling different subsets of a 3D canonical domain, using a neural network representing a mapping function, to obtain a 3D object, according to embodiments;

FIG. 6 is a flowchart of a method of representing a 3D object, the method being implemented by a client device, according to embodiments;

FIG. 7 is a flowchart of a method of representing a 3D object, the method being implemented by a system, according to embodiments;

DETAILED DESCRIPTION

Figure 1:
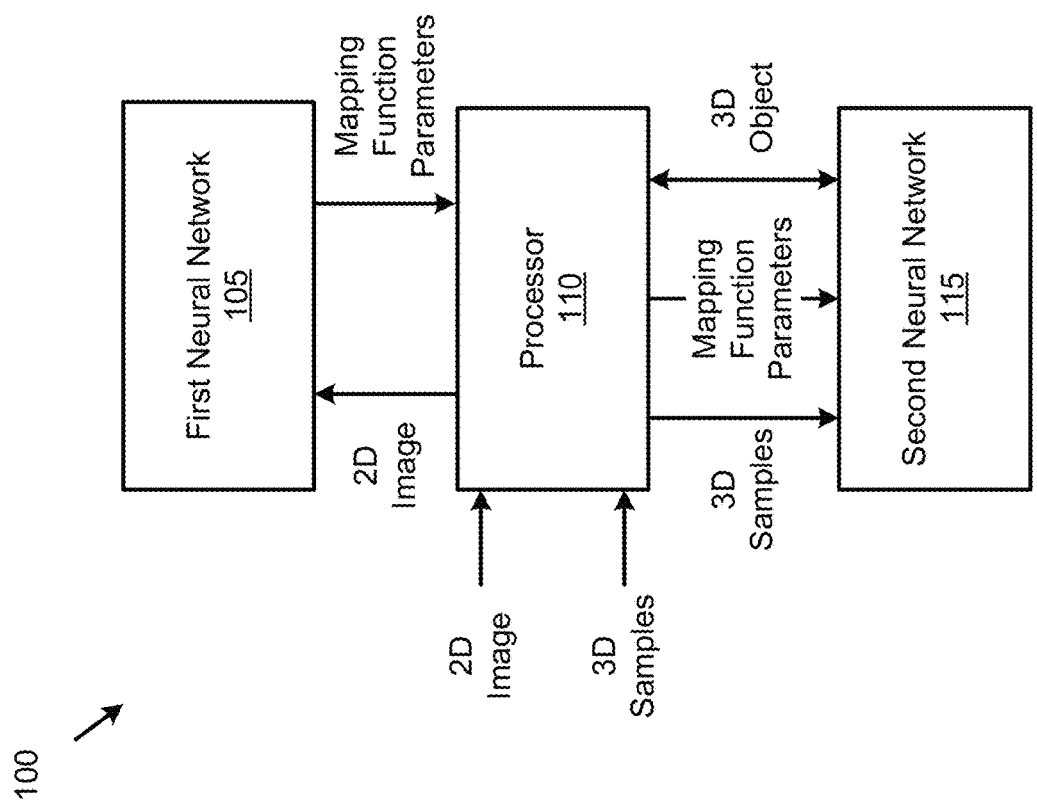
FIG. 1 is a block diagram of an apparatus for representing a 3D object, according to embodiments.

Embodiments of the disclosure provide higher-order function networks for learning a composable 3D object and an operating method thereof. That is, the 3D object may be represented using a higher order function, namely, weights and biases of a small neural network. This representation can be used to reconstruct the 3D object by mapping points from a canonical space to define the 3D object. The reconstructed 3D object may be more accurate than those that are produced by prior art reconstruction methods. Further, encoding the 3D object directly as the neural network is highly parameter efficient when compared with object representations that encode an object of interest as a latent vector codeword.

The embodiments also provide a method of object interpolation in a latent function space, in which roots of reconstruction functions are composed for various objects to generate new, coherent objects.

As the disclosure allows for various changes and numerous examples, the embodiments will be illustrated in the drawings and described in detail in the written description.

However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) or CNN is a representative example of an artificial neural network model simulating brain nerves, and is not limited to an artificial neural network model using an algorithm.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

FIG. 1 is a block diagram of an apparatus 100 for representing a 3D object, according to embodiments.

As shown in FIG. 1, the apparatus 100 includes a first neural network 105, a processor 110 and a second neural network 115.

The first neural network 105 obtains a single 2D image, and obtains mapping function parameters based on the obtained 2D image. The 2D image may be an RGB image including an object or a portion of an object. The first neural network 105 may be a pre-trained DNN or CNN for mapping a 2D image into mapping function parameters. The mapping function parameters are to be used to set the second neural network 115 that may be a pre-trained DNN or CNN representing a mapping function or higher-order function for mapping 3D samples of a 3D canonical domain into a 3D object. The first and second neural networks 105 and 115 may be pre-trained together and in connection with each other, at the same time.

The 2D image may be obtained from a data storage medium including a magnetic medium such as a hard disk, a floppy disk, or a magnetic tape, an optical recording medium such as CD-ROM or DVD, or a magneto-optical medium such as a floptical disk. The 2D image may also be obtained from a camera and obtained via the processor 110.

The processor 110 obtains the mapping function parameters from the first neural network 105, and sets the mapping function of the second neural network 115, using the obtained mapping function parameters.

Based on the mapping function of the second neural network 115 being set, the second neural network 115 obtains or samples the 3D samples, and obtains the 3D object corresponding to the 2D image, based on the obtained 3D samples. The 3D samples may be of a surface or interior of any predetermined canonical domain or space, for example, a unit sphere and a unit cube, e.g., a 512-dimensional unit hypercube. The 3D object may be a 3D representation (e.g., a surface or interior) of the object included in the 2D image, even if the 2D image includes only the portion of the object.

The 3D samples may be obtained from a data storage medium including a magnetic medium such as a hard disk, a floppy disk, or a magnetic tape, an optical recording medium such as CD-ROM or DVD, or a magneto-optical medium such as a floptical disk. The 3D samples may also be obtained via the processor 110.

In detail, for the 2D image I, which may be a 64×64 RGB image, the mapping function parameters $\theta_I$ of a mapping network (i.e., the second neural network 115) may be represented in Equation 1 below:

$$\theta_I = g_\phi(I), \quad \text{(Equation 1)}$$

where an encoder $g_\phi: \mathbb{R}^{64 \times 64 \times 3} \to \mathbb{R}^{|\theta|}$ (i.e., the first neural network 105) is trained with parameters ø to output the mapping function parameters $\theta_I$ of the mapping function $f_{\theta_I}: \mathbb{R}^3 \to \mathbb{R}^3$, from the input 2D image I.

The 3D object O is represented as the mapping function $f_{\theta_I}$ with the mapping function parameters $\theta_I$ that are unique to the 3D object O. The mapping function $f_{\theta_I}$ is represented as a multilayer perceptron (MLP) and maps the 3D samples from the surface or interior of the canonical space X, such as the unit sphere, to a set of points defining the surface or interior of the reconstructed 3D object Ô as represented in Equation 2 below:

$$\hat{O} = \{f_\theta(x) : x \in X\}. \quad \text{(Equation 2)}$$

This construction allows for higher- or lower-resolution sampling of the reconstructed 3D object Ô in an online fashion by continually sampling the 3D samples from the canonical space X as desired, which may correspond to the points within the unit sphere, $X = \{x : \|x\|_2 \le 1\}$.

By representing the 3D object as weights and biases of the second neural network 115 and enabling the 3D object to be modulated by only changing connections strengths of the second neural network 115, the apparatus 100 enables a reduction in a size of a neural network that is used to represent a 3D object in conventional methods, leading to quicker processing times for reconstructing 3D objects from 2D images. Further, the apparatus 100 outperforms the conventional methods by resulting in more similarities between input 2D images and output 3D objects. The apparatus 100 can also obtain 3D objects of arbitrary resolution by adjusting a density of input 3D samples.

In embodiments, the apparatus 100 may be configured to obtain partial point clouds, instead of 2D images, and obtain 3D objects corresponding to the partial point clouds.

During training of the first and second neural networks 105 and 115, an image I and a corresponding ground truth point cloud model Õ are sampled. Õ may contain 10,000 points that are sampled from a surface of a true object O. A mapping function $\hat{f}_{\theta_I} = g_\phi(I)$ is obtained, and an estimated reconstruction of the object O is produced as in Equation 2. However, $f_{\theta_I}(x)$ is computed for only a sample of 1000 points in X (which is uncountably infinite). This sample is drawn from a uniform distribution over a set. A loss for a prediction of the model Õ is computed using a differentiable set similarity metric such as the Chamfer distance or the Earth Mover's Distance. For example, the asymmetric Chamfer distance C(X,Y) is a quasimetric for quantifying a similarity of two point sets X and Y as represented in Equation 3 below:

$$C(X, Y) = \frac{1}{|X|} \Sigma_{x_i \in X} \min_{y_i \in Y} \|x_i - y_i\|^2. \quad \text{(Equation 3)}$$

The encoder $g_\phi$ (the first neural network 105) is trained to minimize a symmetric objective function $\ell(\tilde{O}, O) = C(\hat{O}, O) + C(O, \hat{O})$.

Moreover, the processor 110 may interpolate between input images by composing roots of reconstruction mapping functions. In detail, Equation 2 may be extended in Equation 4 below, in which an object O in an image I is represented as a k-th power of a mapping function $f_{\theta_I}$:

$$\hat{O} = \{f_{\theta_I}^k(x) : x \in X\}, \quad \text{(Equation 4)}$$

where $f^k$ is defined as a composition of $f$ with itself (k−1) times: $f^k(X) = f(f^{(k-1)}(x))$.

The mapping function $f_{\theta_I}$ whose k-th power reconstructs the object O in the image I may be called a k-mapping for the object O.

This modification to Equation 2 adds an additional constraint to the mapping: a domain and a codomain must be the same. However, evaluating powers of f leverages a power of weight sharing in neural network architectures; for an MLP mapping architecture with l layers, evaluating its k-th power is equivalent to an MLP with l×k−1 layers with shared weights, which is equivalent to a recurrent neural network (RNN) with weight sharing in time.

When RGB images I and J of two objects $O_I$ and $O_J$ are acquired, and an encoder discussed above is applied to these images, k-mappings $f_{\theta_I}$ and $f_{\theta_J}$ are obtained, which respectively have parameters $\theta_I = g_\phi(I)$ and $\theta_J = g_\phi(J)$. Interpolations between the objects $O_I$ and $O_J$ by evaluating any of $2^k$ possible functions may be represented in Equation 5 below:

$$f_{interp} = (f_{\theta_1} \circ \ldots \circ f_{\theta_{lk}}), \quad \text{(Equation 5)}$$

where parameters of each mapping function $f_{\theta_i}$ are either the parameters of the k-mappings $f_{\theta_I}$ or $f_{\theta_{Id\_ej}}$.

The k-mappings $f_{\theta_I}$ and $f_{\theta_J}$ encode semantically meaningful information about underlying structures. This is further described with respect to FIGS. 8A-8D below.

Figure 2A:
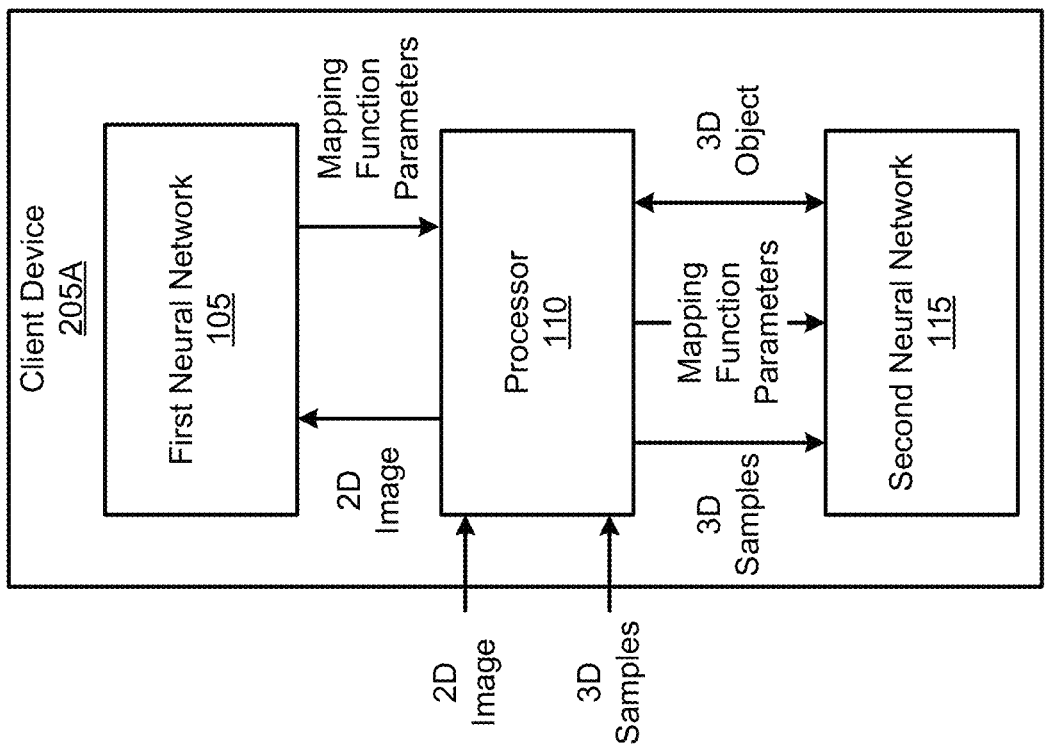
FIG. 2A is a block diagram of a client device implementing the apparatus shown in FIG. 1.

FIG. 2A is a block diagram of a client device 205A implementing the apparatus 100 shown in FIG. 1.

As shown in FIG. 2A, the client device 205 includes the apparatus 100 shown in FIG. 1, namely, the first neural network 105, the processor 110 and the second neural network 115. Thus, the client device 205 obtains a single 2D image, and obtains a 3D object corresponding to the obtained 2D image, using the first neural network 105, the processor 110 and the second neural network 115, as described with respect to FIG. 1.

The client device 205A may include any type of electronic device, for example, a smartphone, a laptop computer, a personal computer (PC), a smart television and the like.

Figure 2B:
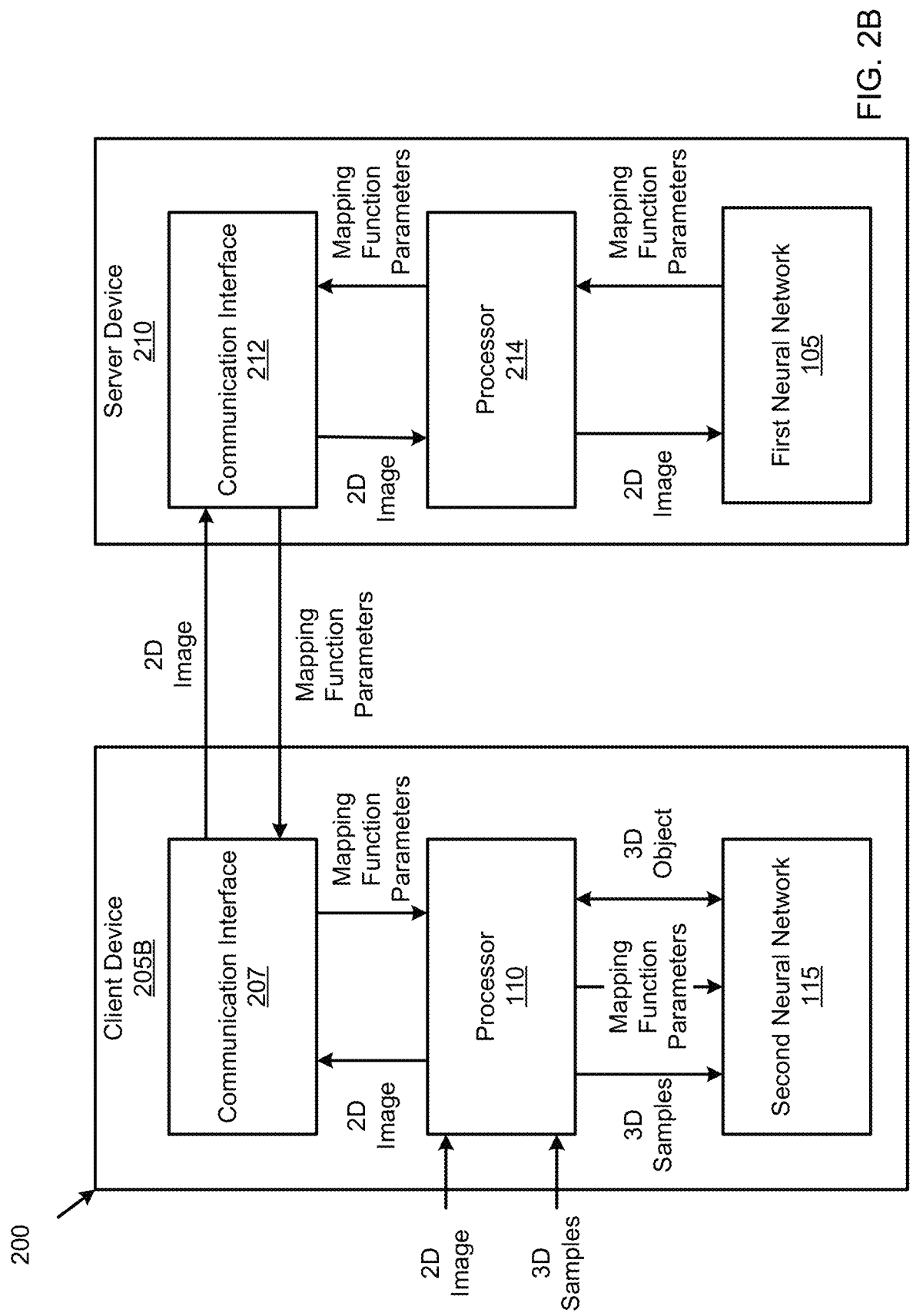
FIG. 2B is a block diagram of a system implementing the apparatus shown in FIG. 1.

FIG. 2B is a block diagram of a system 200 implementing the apparatus 100 shown in FIG. 1.

As shown in FIG. 2B, the system 200 includes a client device 205B and a server device 210. The client device 205B includes the processor 110 and the second neural network 115, as described with respect to FIG. 1, and further includes a communication interface 207. The server device 210 includes the first neural network 105, as described with respect to FIG. 1, and further includes a communication interface 212 and a processor 214.

The client device 205B may include any type of electronic device, for example, a smartphone, a laptop computer, a personal computer (PC), a smart television and the like.

The client device 205B, using the processor 110, obtains a single 2D image, as described with respect to FIG. 1. The client device 205B further transmits the obtained 2D image to the server device 210 via the communication interface 207.

The server device 210 receives the 2D image from the client device 205B via the communication interface 212. The server device 210, using the processor 214, further inputs the received 2D image into the first neural network 105.

The first neural network 105 obtains mapping function parameters, based on the input 2D image, as described with respect to FIG. 1. The server device 210 further transmits the obtained mapping function parameters to the client device 205B via the communication interface 212.

The client device 205B receives the mapping function parameters from the server device 210 via the communication interface 207. The client device 205B, using the processor 110, further sets the mapping function of the second neural network 115, using the received mapping function parameters, as described with respect to FIG. 1.

Based on the mapping function of the second neural network 115 being set, the second neural network 115 obtains or samples the 3D samples, and obtains the 3D object corresponding to the 2D image, based on the obtained 3D samples, as described with respect to FIG. 1.

The first neural network 105 for mapping the 2D image into the mapping function parameters may be larger in size than the second neural network 115 for mapping the 3D samples into the 3D object. Thus, by implementing the first neural network 105 on the server device 210 and implementing the second neural network 115 on the client device 205B, a processing efficiency of the client device 205B for mapping the 2D image into the 3D object may be increased in comparison to that of the client device 205A shown in FIG. 2A.

In FIGS. 1-2B, each of the processor 110 and the processor 214 may be implemented through a dedicated processor or through a combination of software and general-purpose processor such as application processor (AP), central processing unit (CPU) or graphic processing unit (GPU). The dedicated processor may be implemented by including a memory for implementing embodiments of the disclosure or by including a memory processor for using an external memory.

Also, each of the processor 110 and the processor 214 may be configured by a plurality of processors. In this case, each of the processor 110 and the processor 214 may be implemented through a combination of dedicated processors or through a combination of software and general-purpose processors such as AP, CPU or GPU.

In FIG. 2B, each of the communication interface 207 and 212 may include one or more components causing communication to be performed via a local area network (LAN), a wide area network (WAN), a value added network (VAN), a mobile radio communication network, a satellite communication network, or a combination thereof.

In FIGS. 1-2B, each of the apparatus 100, the client device 205A, the client device 205B and the server device 210 may include a CPU, a memory, and a computer program including instructions. The computer program is stored in the memory. The apparatus 100, the client device 205A, the client device 205B and the server device 210 may respectively perform functions described with reference to FIGS. 1-2B according to execution of the computer program by the CPU. The functions described with reference to FIGS. 1-2B are performed by a dedicated hardware chip and/or the CPU.

FIG. 3 is a diagram of a 2D image and a 3D object that are respectively input to and output from an apparatus for representing a 3D object, according to embodiments.

Portion (a) of FIG. 3 is a 2D image of an object, in this case, an airplane. The apparatus 100 shown in FIG. 1 may transform the 2D image into a 3D object corresponding to the 2D image, as shown in portion (b) of FIG. 3. In this case, the 3D object is a 3D representation of the airplane included in the 2D image.

FIG. 4 is a diagram of a method of sampling different subsets of a 3D canonical domain, using a neural network representing a mapping function, to obtain a 3D object, according to embodiments.

Portions (a)-(d) of FIG. 4 respectively show different highlighted portions of points of a sphere being sampled by, e.g., the second neural network 115 shown in FIG. 1. Portions (a)-(d) of FIG. 4 further shows different highlighted portions of a 3D object (e.g., an airplane) being reconstructed by, e.g., the second neural network 115, as the different portions of the points of the sphere are respectively being sampled. In detail, the mapping function $f_\theta$ can be visualized by the different highlighted portions $\tilde{X} \subset X$ of the sphere and their corresponding different highlighted portions $\{f_\theta(\tilde{x}_i), \tilde{x}_i \in \tilde{X}\}$ of the entire reconstructed 3D object $\{f_\theta(x_i), x_i \in X\}$.

Figure 5:
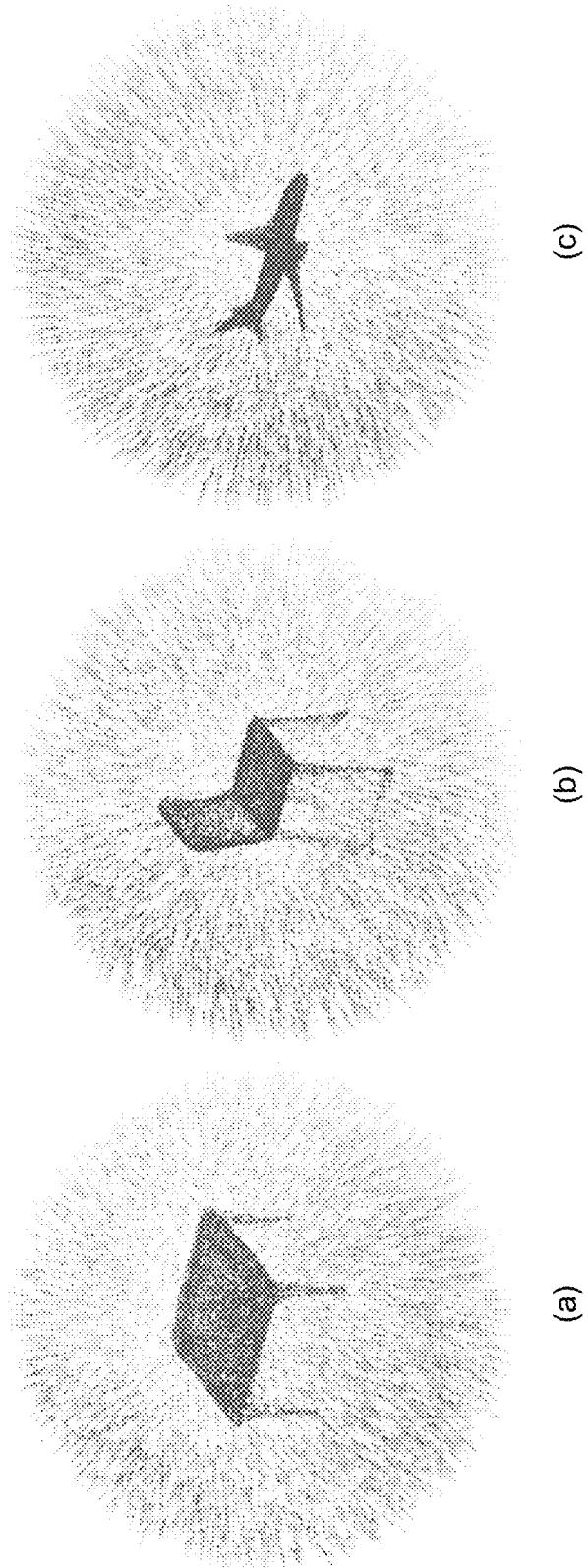
FIG. 5 is a diagram of 3D objects respectively corresponding to 3D samples of 3D canonical domains, according to embodiments.

FIG. 5 is a diagram of 3D objects respectively corresponding to 3D shape points, according to embodiments.

Portions (a)-(c) of FIG. 5 respectively show 3D objects (a table, a chair and an airplane) that may be reconstructed by, e.g., the second neural network 115 shown in FIG. 1. The 3D objects are respectively shown with points of spheres that are sampled to obtain the 3D objects.

FIG. 6 is a flowchart of a method 600 of representing a 3D object, the method being implemented by a client device, according to embodiments.

Referring to FIG. 6, the method 600 may be performed by the client device 205A of FIG. 2A.

In operation 605, the method 600 includes, based on a 2D image, obtaining mapping function parameters, using a first neural network.

In operation 610, the method 600 includes, setting a mapping function of a second neural network, based on the obtained mapping function parameters.

In operation 615, the method 600 includes, based on 3D samples, obtaining the 3D object corresponding to the 2D image, using the second neural network of which the mapping function is set.

Detailed description of the method 600 was described with respect to the apparatus 100 and the client device 205A respectively shown in FIGS. 1 and 2A, and will be omitted herein.

FIG. 7 is a flowchart of a method 700 of representing a 3D object, the method being implemented by a system, according to embodiments.

Referring to FIG. 7, the method may be performed by the client device 205B included in the system shown in FIG. 2B.

In operation 705, the method 700 includes transmitting a 2D image to an external device.

In operation 710, the method 700 includes, based on the 2D image being transmitted, receiving, from the external device, mapping function parameters that are obtained using a first neural network.

In operation 715, the method 700 includes setting a mapping function of a second neural network, based on the received mapping function parameters.

In operation 720, the method 700 includes, based on 3D samples, obtaining the 3D object corresponding to the 2D image, using the second neural network of which the mapping function is set.

Detailed description of the method 700 was described with respect to the system 200 shown in FIG. 2B, and will be omitted herein.

Figure 8A:
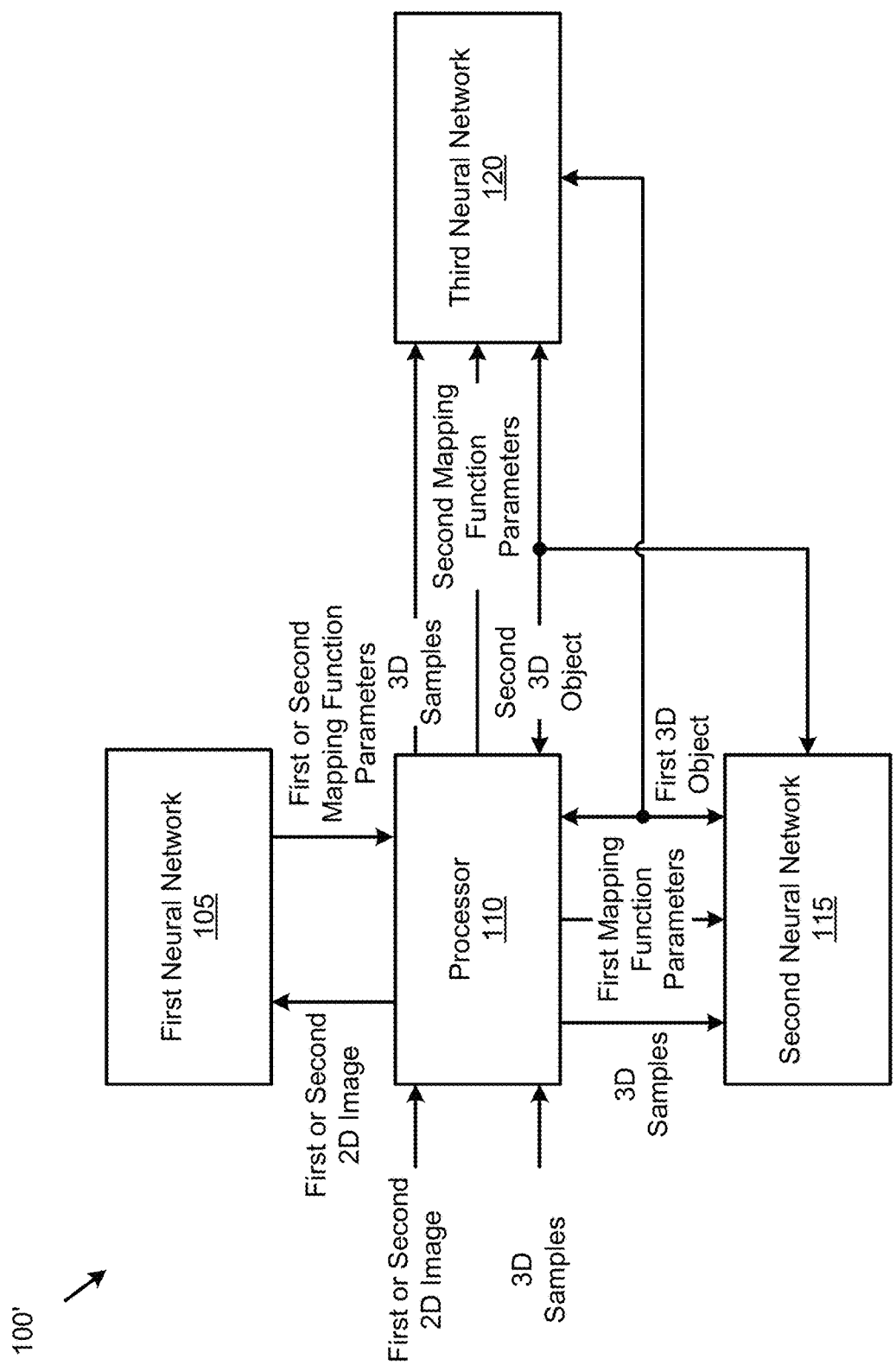
FIG. 8A is a block diagram of an apparatus for representing a first 3D object and a second 3D object, according to embodiments.

FIG. 8A is a block diagram of an apparatus 100' for representing a first 3D object and a second 3D object, according to embodiments.

As shown in FIG. 8A, the apparatus 100' includes the first neural network 105, the processor 110 and the second neural network 115 as described with respect to FIG. 1. The apparatus 100' further includes a third neural network 120.

In addition to FIG. 1, referring to FIG. 8A, the first neural network 105 obtains a second 2D image in addition to a first 2D image, i.e., the 2D image of FIG. 1. The 2D image may be an RGB image including an object or a portion of an object.

The first neural network 105 obtains second mapping function parameters based on the obtained second 2D image, in addition to first mapping function parameters, i.e., the mapping function parameters of FIG. 1. The second mapping function parameters are to be used to set the third neural network 120 that may be a pre-trained DNN or CNN representing a mapping function or higher-order function for mapping 3D samples of a 3D canonical domain into a second 3D object in addition to a first 3D object, i.e., the 3D object of FIG. 1. The first, second and third neural networks 105, 115 and 120 may be pre-trained together and in connection with each other, at the same time.

The second 2D image may be obtained from a data storage medium including a magnetic medium such as a hard disk, a floppy disk, or a magnetic tape, an optical recording medium such as CD-ROM or DVD, or a magneto-optical medium such as a floptical disk. The second 2D image may also be obtained from a camera and obtained via the processor 110.

The processor 110 obtains the second mapping function parameters from the first neural network 105, and sets the mapping function of the third neural network 120, using the obtained second mapping function parameters.

Based on the mapping function of the third neural network 120 being set, the third neural network 120 obtains or samples the 3D samples, and obtains the second 3D object corresponding to the second 2D image, based on the obtained 3D samples. The 3D samples correspond to the 3D samples described with respect to FIG. 1. The second 3D object may be a 3D representation (e.g., a surface or interior) of the object included in the second 2D image, even if the second 2D image includes only the portion of the object.

In addition to FIG. 1, referring to FIG. 8A, based on the mapping function of the second neural network 115 being set, the second neural network 115 may obtain or sample, via the processor 110, the obtained first 3D object and/or the obtained second 3D object, and re-obtain the first 3D object, based on the obtained first 3D object and/or the obtained second 3D object. The re-obtained first 3D object may be a 3D representation (e.g., a surface or interior) of an interpolation or mix between the obtained first 3D object and/or the obtained second 3D object. Such re-obtaining of the first 3D object may be repeated any number of times as controlled by the processor 110.

Similarly, based on the mapping function of the third neural network 120 being set, the third neural network 120 may obtain or sample, via the processor 110, the obtained first 3D object and/or the obtained second 3D object, and re-obtain the second 3D object, based on the obtained first 3D object and/or the obtained second 3D object. The re-obtained second 3D object may be a 3D representation (e.g., a surface or interior) of an interpolation or mix between the obtained first 3D object and/or the obtained second 3D object. Such re-obtaining of the second 3D object may be repeated any number of times as controlled by the processor 110.

Figure 8B:
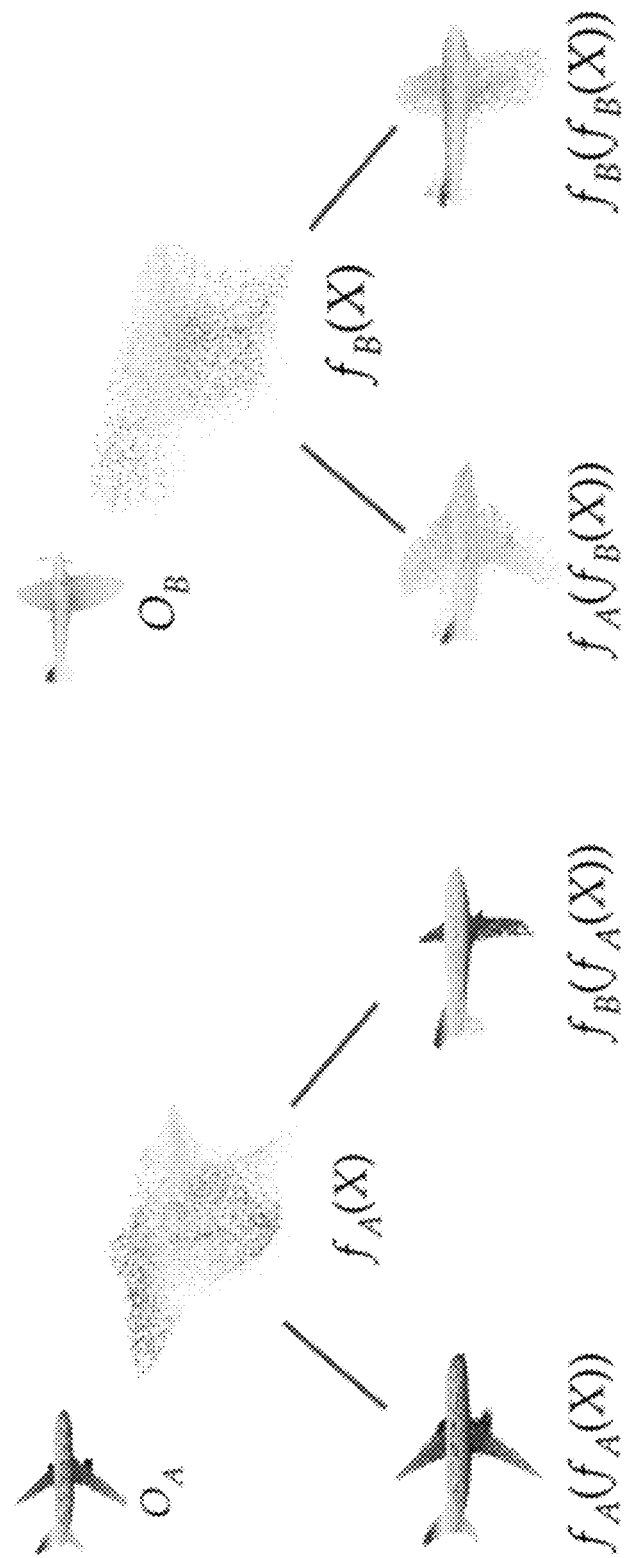
FIG. 8B is diagram of a method of interpolating between a first 3D object and a second 3D object by function composition, according to embodiments.

FIG. 8B is diagram of a method of interpolating between a first 3D object $f_A(X)$ and a second 3D object $f_B(X)$ by function composition, according to embodiments.

As shown in FIG. 8B, a first object $O_A$ of a first 2D image is a passenger plane, and a second object $O_B$ of a second 2D image is a propeller plane.

Referring to FIGS. 8A and 8B, the first neural network 105 obtains mapping function parameters of a first function $f_A$, based on the first 2D image of the first object $O_A$, and mapping function parameters of a second function $f_B$, based on the second 2D image of the second object $O_B$.

Based on the first mapping function $f_A$ of the second neural network 115 being set, the second neural network 115 obtains or samples 3D samples X, and obtains the first 3D object $f_A(X)$ corresponding to the first object $O_A$, based on the obtained 3D samples X Based on the second mapping function $f_B$ of the third neural network 120 being set, the third neural network 120 obtains or samples the 3D samples X, and obtains the second 3D object $f_B(X)$ corresponding to the second object $O_B$, based on the obtained 3D samples X.

Further, the second neural network 115 obtains or samples the obtained first 3D object $f_A(X)$, and re-obtains the first 3D object $f_A(f_A(X))$, based on the obtained first 3D object $f_A(X)$. The re-obtained first 3D object $f_A(f_A(X))$ is a 3D representation of an interpolation of the obtained first 3D object $f_A(X)$, and more resembles the first object $O_A$ than the obtained first 3D object $f_A(X)$.

The third neural network 120 obtains or samples the obtained first 3D object $f_A(X)$, and re-obtains the second 3D object $f_B(f_A(X))$, based on the obtained first 3D object $f_A(X)$. The re-obtained second 3D object $f_B(f_A(X))$ is a 3D representation of an interpolation or mix between the obtained first 3D object $f_A(X)$ and the obtained second 3D object $f_B(X)$, and corresponds to the passenger plane (the first object $O_A$) having broader wings like those of the propeller plane (the second object $O_B$).

The second neural network 115 obtains or samples the obtained second 3D object $f_B(X)$, and re-obtains the first 3D object $f_A(f_B(X))$, based on the obtained second 3D object $f_B(X)$. The re-obtained first 3D object $f_A(f_B(X))$ is a 3D representation of an interpolation or mix between the obtained first 3D object $f_A(X)$ and the obtained second 3D object $f_B(X)$, and corresponds to the propeller plane (the second object $O_B$) having straighter wings like those of the passenger plane (the first object $O_A$).

The third neural network 120 obtains or samples the obtained second 3D object $f_B(X)$, and re-obtains the second 3D object $f_B(f_B(X))$, based on the obtained second 3D object $f_B(X)$. The re-obtained second 3D object $f_B(f_B(X))$ is a 3D representation of an interpolation of the obtained second 3D object $f_B(X)$, and more resembles the second object $O_B$ than the obtained second 3D object $f_B(X)$.

By interpolating between the first 3D object $f_A(X)$ and the second 3D object $f_B(X)$ as described above, new 3D objects may be obtained, such as the re-obtained second 3D object $f_B(f_A(X))$ and the re-obtained first 3D object $f_A(f_B(X))$.

Figure 8C:
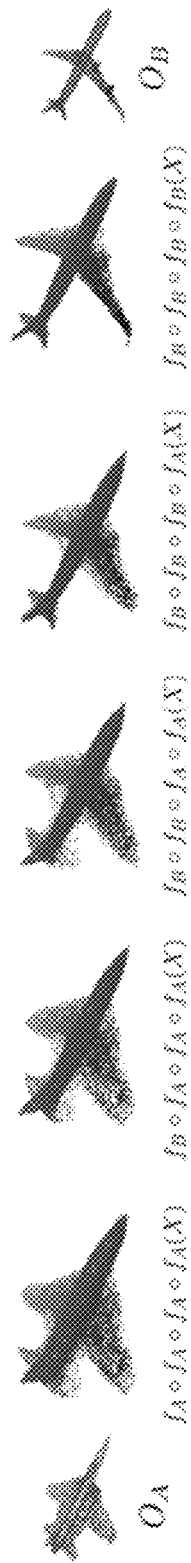
FIG. 8C is a diagram of a method of interpolating between a first 3D object and a second 3D object with higher order k-mappings, according to embodiments.

FIG. 8C is a diagram of a method of interpolating between a first 3D object and a second 3D object with higher order k-mappings, according to embodiments.

As shown in FIG. 8C, a first object $O_A$ of a first 2D image is a fighter plane, and a second object $O_B$ of a second 2D image is a passenger plane.

New 3D objects may be obtained by sampling 3D samples X, using any one or any combination of a first mapping function $f_A$ of a first neural network and a second mapping function $f_B$ of a second neural network. For example, a middle 3D object $f_B \circ f_B \circ f_A \circ f_A(X)$ may be obtained by sampling the 3D samples X, using the first mapping function $f_A$ twice followed by the second mapping function $f_B$ twice. The middle 3D object $f_B \circ f_B \circ f_A \circ f_A(X)$ is a 3D representation of an interpolation or mix between the first object $O_A$ and the second object $O_B$, while 3D objects left of the middle 3D object $f_B \circ f_B \circ f_A \circ f_A(X)$ are more similar to the first object $O_A$ and 3D objects right of the middle 3D object $f_B \circ f_B \circ f_A \circ f_A(X)$ are more similar to the second object $O_B$.

Figure 8D:
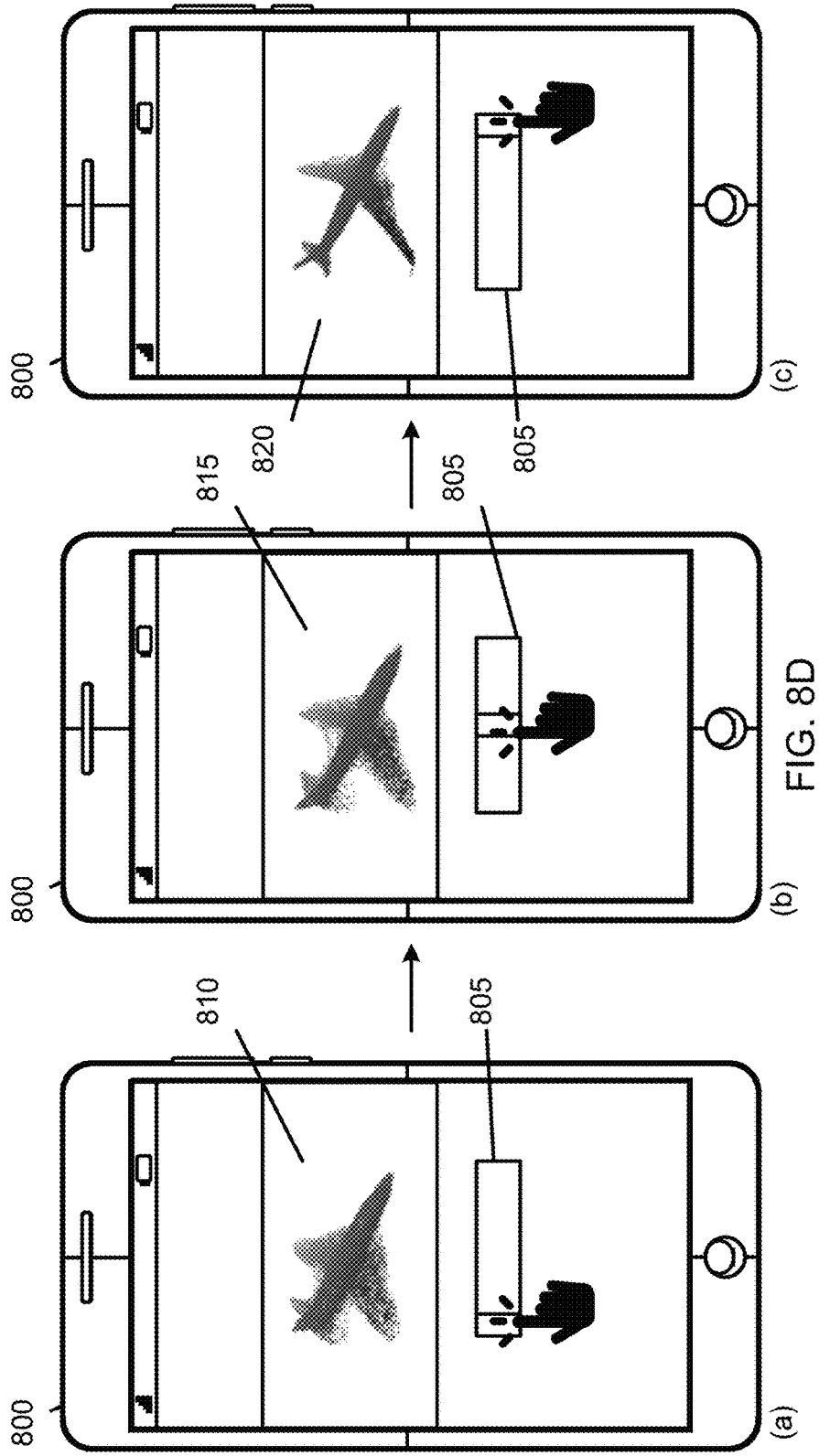
FIG. 8D is a diagram of a use case of the apparatus shown in FIG. 8A.

FIG. 8D is a diagram of a use case of the apparatus 100' shown in FIG. 8A.

As shown in FIG. 8D, a smartphone 800 implementing the apparatus 100' may display a slider 805. In portion (a), based on a drag input dragging the slider 805 to a leftmost position, the smartphone 800 may display an image 810 including a 3D object ($f_A \circ f_A \circ f_A \circ f_A(X)$ of FIG. 8C) most resembling a first object ($O_A$ of FIG. 8C).

In portion (b), based on a drag input dragging the slider 805 to a middle position, the smartphone 800 may display an image 815 including a 3D object ($f_B \circ f_B \circ f_A \circ f_A(X)$ of FIG. 8C) resembling both the first object and a second object ($O_B$ of FIG. 8C).

In portion (c), based on a drag input dragging the slider 805 to a rightmost position, the smartphone 800 may display an image 820 including a 3D object ($f_B \circ f_B \circ f_B \circ f_B(X)$ of FIG. 8C) most resembling the second object.

Figure 9:
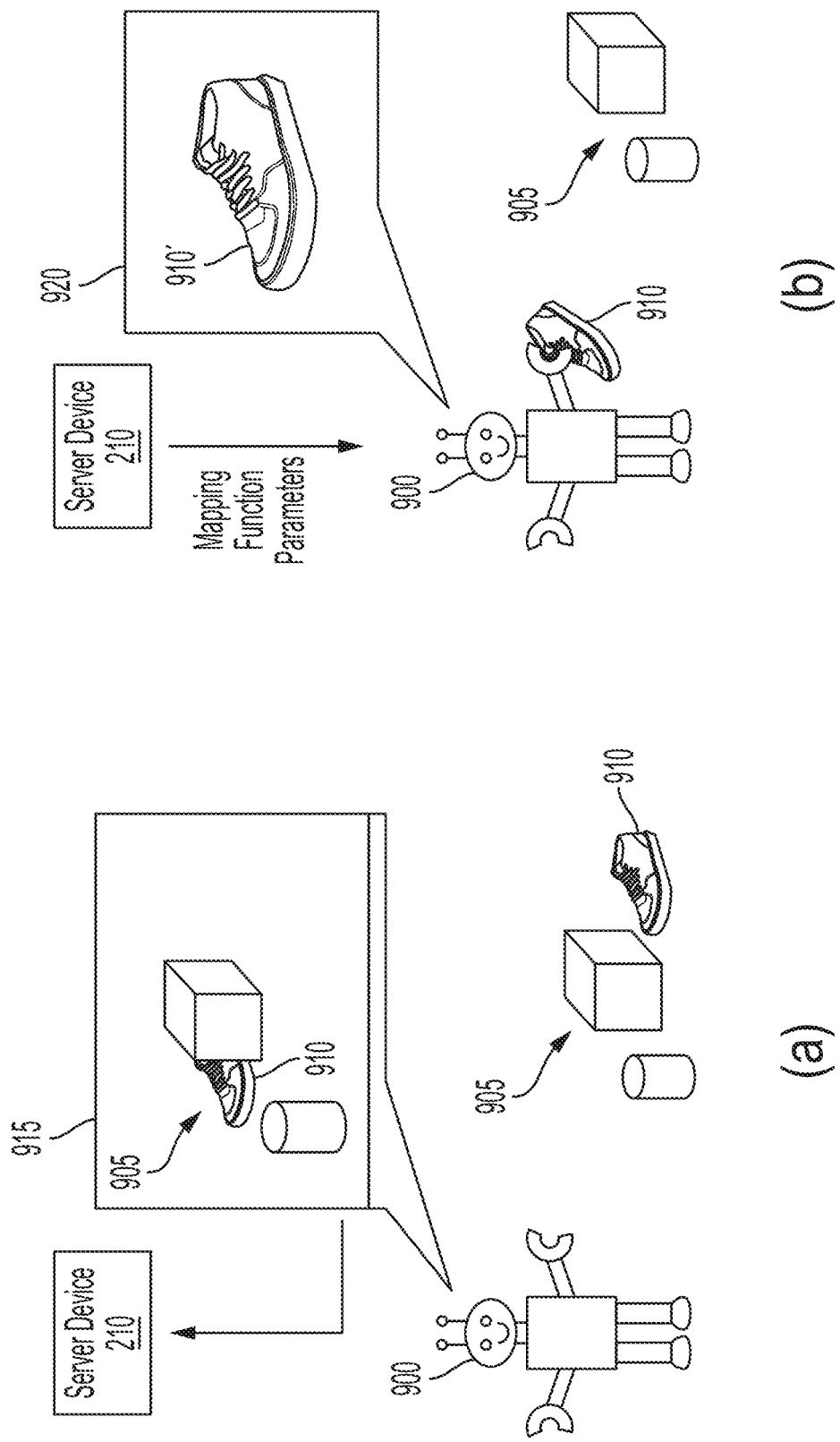
FIG. 9 is a diagram of a use case of the system shown in FIG. 2B, in which a robot implements a client device included in the system.

FIG. 9 is a diagram of a use case of the system 200 shown in FIG. 2B, in which a robot 900 implements the client device 205B included in the system 200.

As shown in portion (a) of FIG. 9, the robot 900 implementing the client device 205B is near a plurality of objects 905 including a shoe 910, and wants to pick up the shoe 910 with its arm and hand. The robot 900 includes a camera that obtains a 2D image 915 of the plurality of objects 905, in which the shoe 910 is partially blocked by at least one of the plurality of objects 905.

To accurately pick up the shoe 910, the robot 900 may need a 3D model of the shoe 910 that is not partially blocked by any of the plurality of objects 905. With such a 3D model, the robot 900 may rotate the 3D model to learn the best location to pick up the shoe 910. Accordingly, the robot 900 sends the obtained 2D image to the server device 210 described in FIG. 2B.

In portion (b), based on the 2D image being sent, the robot 900 receives mapping function parameters from the server device 210, and sets a mapping function of a neural network (the second neural network 115 of FIG. 2B) included in the robot 900, using the obtained mapping function parameters. Based on the mapping function of the neural network being set, the robot obtains a 3D object 910' corresponding to the shoe 910 in a view 920, which can be used to accurately pick up the shoe 910 among the plurality of objects 905 as shown in portion (b).

To properly obtain the mapping function parameters and the 3D object 910', the robot 900 may further include a depth sensor included in an infrared camera or an RGB-D camera that estimates a true size of the shoe 910, based on the obtained 2D image. The robot 900 may send the estimated size of the shoe 910 to the server device 210, along with the obtained 2D image. The server device 210 may adjust the obtained 2D image, based on the estimated size of the shoe 910, to a fixed, predetermined scale, to properly and accurately obtain the mapping function parameters.

Figure 10:
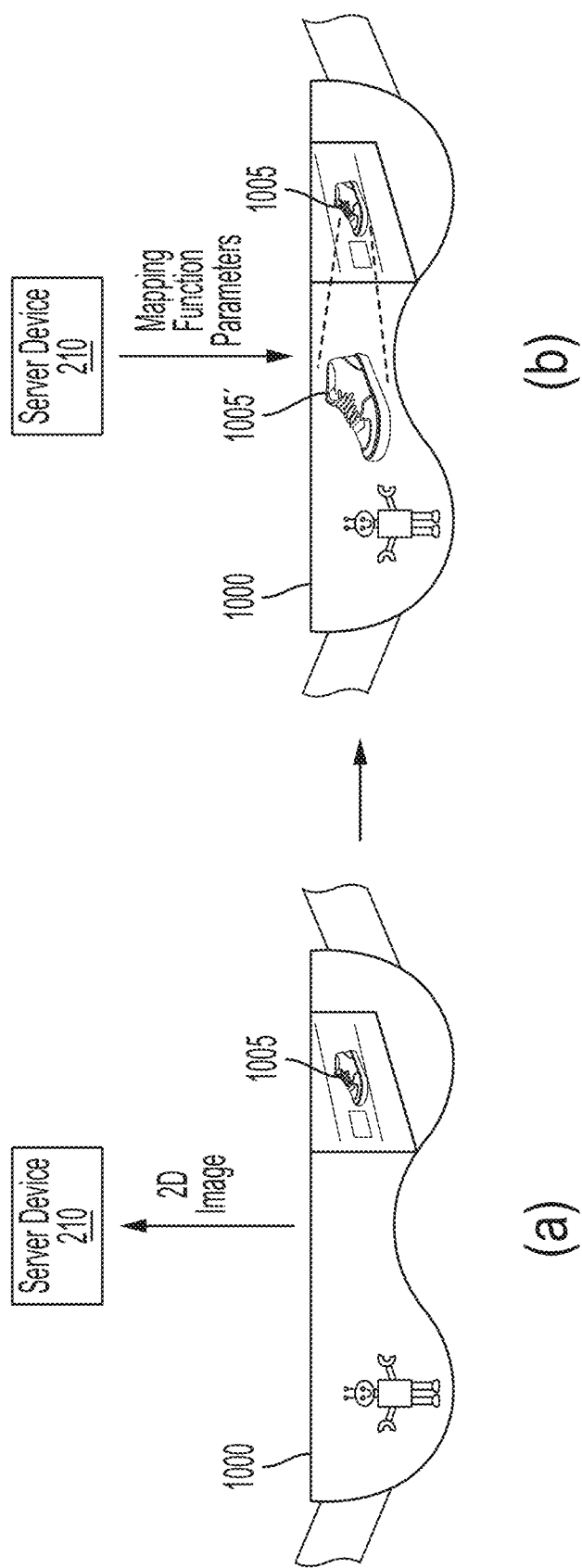
FIG. 10 is a diagram of a use case of the system shown in FIG. 2B, in which augmented reality (AR) glasses implement the client device included in the system.

FIG. 10 is a diagram of a use case of the system 200 shown in FIG. 2B, in which AR glasses 1000 implement the client device 205B included in the system 200.

As shown in portion (a) of FIG. 10, a user wearing the AR glasses 1000 implementing the client device 205B may be in a store shopping for a shoe 1005, see the shoe 1005 on a store shelf through the AR glasses 1000, and want to learn more about the shoe 1005. The AR glasses 1000 includes a camera that obtains a 2D image of the store and the shoe 1005. To learn more about the shoe 1005, the AR glasses 1000 sends the obtained 2D image to the server device 210 described in FIG. 2B.

In portion (b), based on the 2D image being sent, the AR glasses 1000 receives mapping function parameters from the server device 210, and sets a mapping function of a neural network (the second neural network 115 of FIG. 2B) included in the AR glasses 1000, using the obtained mapping function parameters. Based on the mapping function of the neural network being set, the AR glasses 1000 obtains and displays a 3D object 1005' corresponding to the shoe 1005 in an AR environment of the store. The 3D object 1005' can be used to learn more about shoe 1005. For example, the user wearing the AR glasses 1000 may instruct the AR glasses 1000 to rotate and inspect the 3D object 1005', without interacting with the real-life shoe 1005.

Figure 11:
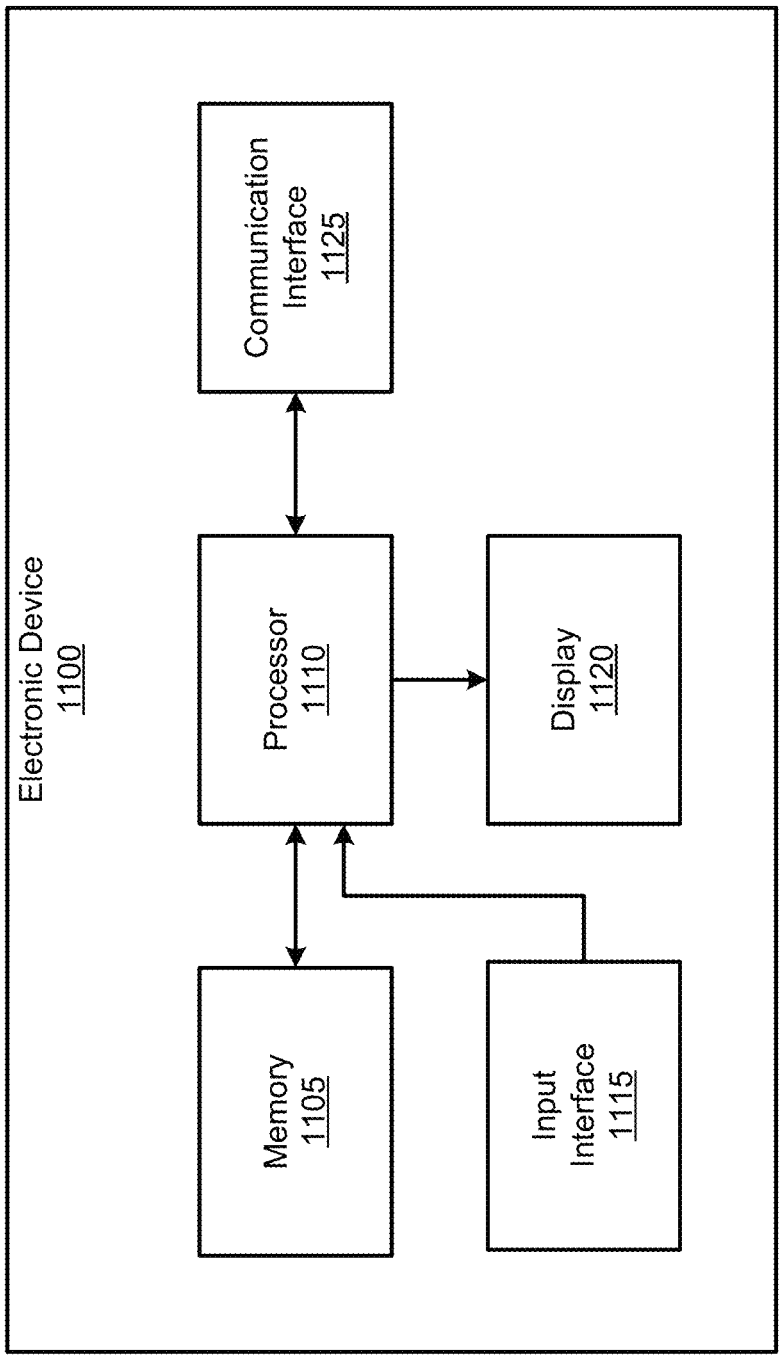
FIG. 11 is a block diagram of an electronic device implementing an apparatus for representing a 3D object, according to embodiments.

FIG. 11 is a block diagram of an electronic device 1100 implementing an apparatus for representing a 3D object, according to embodiments.

Referring to FIG. 11, the electronic device 1100 includes a memory 1105, a processor 1110, an input interface 1115, a display 1120 and a communication interface 1125. The electronic device 1100 may be implemented in each of the apparatus 100, the client devices 205A and 205B and the server device 210 shown in FIGS. 1-2B, respectively.

The processor 1110 takes overall control of the electronic device 1100. The processor 1110 executes one or more programs stored in the memory 1105.

The memory 1105 stores various data, programs, or applications for driving and controlling the electronic device 1100. A program stored in the memory 1105 includes one or more instructions. A program (one or more instructions) or an application stored in the memory 1105 may be executed by the processor 1110.

The processor 1110 may perform any one or any combination of operations of the apparatus 100, the client device 205A and the system 200 that are respectively shown in FIGS. 1-2B and have been described with reference to FIGS. 1-2B, 6 and 7.

The input interface 1115 may receive a user input and/or a data such as a 2D image. The input interface 1115 may include, for example, a touchscreen, a camera, a microphone, a keyboard, a mouse or any combination thereof.

The display 1120 may obtain data from, e.g., the processor 1110, and may display the obtained data. The display 1120 may include, for example, a touchscreen, a television, a computer monitor and the like.

The communication interface 1125 transmits and receives data to and from other electronic devices, and may include one or more components causing communication to be performed via a local area network (LAN), a wide area network (WAN), a value added network (VAN), a mobile radio communication network, a satellite communication network, or a combination thereof.

The block diagram of the electronic device 1100 is provided as an example. Each component in the block diagram may be integrated, added, or omitted depending upon specifications of the electronic device 1100 that is actually implemented. That is, two or more components may be integrated into one component or one component may be divided into two or more components, as needed. In addition, functions performed by the respective blocks are provided for illustrating the embodiments of the disclosure, and operations or devices of the respective blocks do not limit the scope of the disclosure.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN or CNN described above may be implemented via a software module. When the DNN or CNN model is implemented via a software module (for example, a program module including instructions), the DNN or CNN model may be stored in a computer-readable recording medium.

Also, the DNN or CNN model may be a part of the apparatus 100 described above by being integrated in a form of a hardware chip. For example, the DNN or CNN model may be manufactured in a form of a dedicated hardware chip for AI, or may be manufactured as a part of an existing general-purpose processor (for example, CPU or application processor) or a graphic-dedicated processor (for example GPU).

Also, the DNN or CNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. An augmented reality (AR) glasses worn by a user, the AR glasses comprising:
   a camera;
   a memory storing instructions; and
   a processor configured to execute the instructions to:
   obtain a two-dimensional (2D) image of an object using the camera;
   transmit the 2D image to a server device;
   based on the 2D image being transmitted, receive, from the server device, mapping function parameters that are obtained using a first neural network;
   set a mapping function of a second neural network, based on the received mapping function parameters; and
   based on three-dimensional (3D) samples, obtain an 3D object corresponding to the 2D image, using the second neural network of which the mapping function is set.

2. The AR glasses of claim 1, the processor further configured to execute the instructions to display the obtained 3D object in an AR environment.

3. The AR glasses of claim 2, the processor further configured to execute the instructions to rotate the displayed 3D object in the AR environment.

4. The AR glasses of claim 2, the processor further configured to execute the instructions to inspect the displayed 3D object in the AR environment.

5. The AR glasses of claim 2, wherein the displayed 3D object in the AR environment is displayed without interacting with the object.

6. The AR glasses of claim 1, wherein the 3D samples are of a surface or an interior of a 3D canonical domain.

7. The AR glasses of claim 6, wherein the 3D canonical domain is a unit sphere or a unit cube.

8. The AR glasses of claim 1, wherein the 3D object is a surface or an interior of the object of the 2D image.

9. The AR glasses of claim 1, wherein the first neural network is a convolutional neural network (CNN) that is trained to output the mapping function parameters, based on the 2D image that is input in the CNN, and is trained in connection with the second neural network.

10. The AR glasses of claim 1, wherein the second neural network is a convolutional neural network (CNN) that is trained to output the 3D object, based on the 3D samples that are input in the CNN, and is trained in connection with the first neural network.

11. The AR glasses of claim 1, wherein the AR glasses is a client device that is separate and external from the server device.

12. A method of representing a three-dimensional (3D) object, the method being performed by an augmented reality (AR) glasses worn by a user, and the method comprising:
   obtaining a two-dimensional (2D) image of an object using a camera;
   transmitting the 2D image to a server device;
   based on the 2D image being transmitted, receiving, from the server device, mapping function parameters that are obtained using a first neural network;
   setting a mapping function of a second neural network, based on the received mapping function parameters; and based on 3D samples, obtaining an 3D object corresponding to the 2D image, using the second neural network of which the mapping function is set.

13. The method of claim 12, the method further comprising displaying the obtained 3D object in an AR environment.

14. The method of claim 13, the method further comprising rotating the displayed 3D object in the AR environment.

15. The method of claim 13, the method further comprising inspecting the displayed 3D object in the AR environment.

16. The method of claim 13, wherein the displayed 3D object in the AR environment is displayed without interacting with the object.

17. The method of claim 12, wherein the 3D samples are of a surface or an interior of a 3D canonical domain.

18. The method of claim 17, wherein the 3D canonical domain is a unit sphere or a unit cube.

19. The method of claim 12, wherein the 3D object is a surface or an interior of the object of the 2D image.

20. A non-transitory computer-readable storage medium storing instructions configured to cause a processor to:
   obtain a two-dimensional (2D) image of an object using a camera;
   transmit the 2D image to a server device;
   based on the 2D image being transmitted, receive, from the server device, mapping function parameters that are obtained using a first neural network;
   set a mapping function of a second neural network, based on the received mapping function parameters; and
   based on three-dimensional (3D) samples, obtain an 3D object corresponding to the 2D image, using the second neural network of which the mapping function is set.

* * * * *